W. S. G. BAKER.
Car-Axle and Loose-Wheel.

No. 203,577. Patented May 14. 1878.

UNITED STATES PATENT OFFICE.

WILLIAM S. G. BAKER, OF BALTIMORE, MARYLAND.

IMPROVEMENT IN CAR-AXLES AND LOOSE WHEELS.

Specification forming part of Letters Patent No. 203,577, dated May 14, 1878; application filed February 4, 1878.

*To all whom it may concern:*

Be it known that I, W. S. G. BAKER, of the city and county of Baltimore, State of Maryland, have invented a new and useful Improvement in Arranging Wheels upon Axles for Railway-Cars and Engine-Trucks, which improvement is fully described and set forth in the following specification, reference being had to the accompanying drawings.

The object of my invention is to relieve the axles of railway-cars from strain brought to bear when passing curves, as is the case where the wheels are both rigidly fitted to the axles.

I am aware that many forms of divided axles and of wheels and parts of wheels that have motion independent of the axle have been devised for the same purpose.

I have invented and applied certain devices which, in practice, have overcome the difficulties heretofore experienced in the construction of such wheels and axles. One of the wheels of each pair is allowed to turn independent of its mate, when desirable, it being secured to the axle, as fully explained in connection with the drawings, in which—

Figure 1:
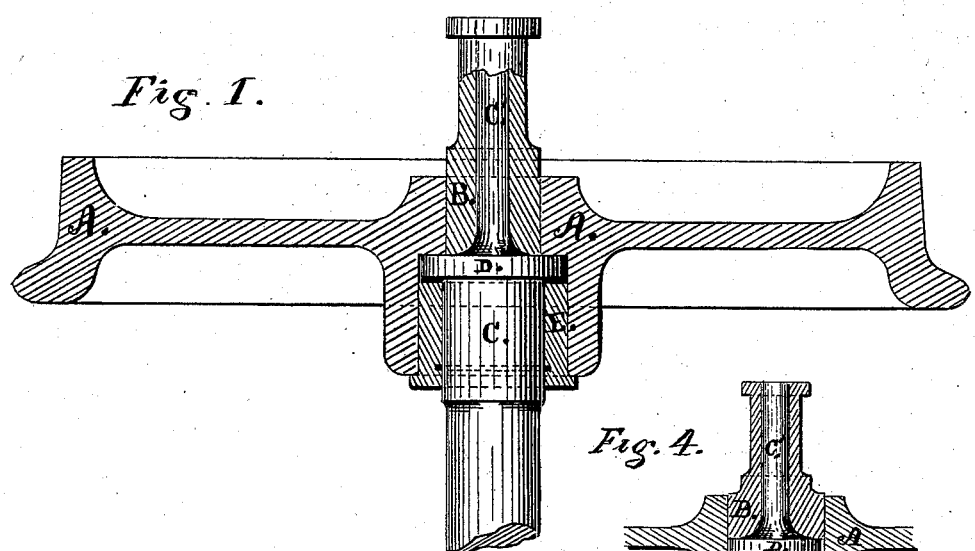
Figure 4:
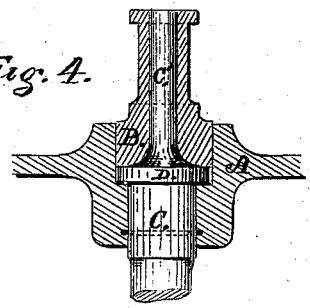
Figure 2:
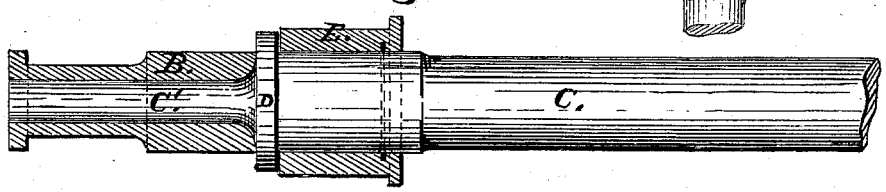
Figure 3:
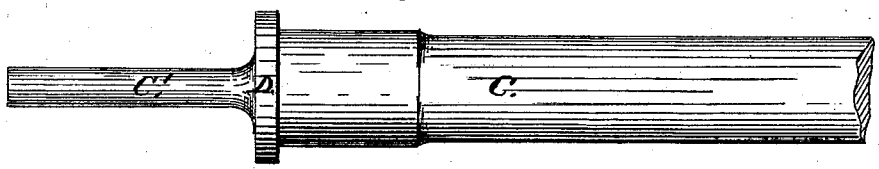

Figure 1 shows a cross-section of the wheel counterbored and the axle in place, with the revolving journal and loose thimble fixed to the wheel, which journal and thimble are made fast to the wheel and held in place by friction. Fig. 2 shows the axle with the loose thimble and loose journal in place on the axle, ready to be applied to the wheel. Fig. 3 is an elevation of the axle turned to proper size to fit into the loose journal and loose thimble. Fig. 4 is a modification of the general plan as shown in Figs. 1, 2, and 3, in which the counterbore is formed on the opposite side from that shown in Fig. 1, the collar on the axle being held in place by the loose journal forced into the hub of the wheel.

The axle C, as shown in Figs. 1, 2, 3, and 4, is made of wrought iron or steel, and extends from end to end of journals, having one of the wheels rigidly fitted to it, as in common practice, and the other end is formed with an arm, C', as shown in Figs. 1, 2, 3, and 4, and fitted with a collar, D, at a proper distance from the end, so that it may fit into the counterbore formed within the hub of the wheel A. This counterboring of the hub of the wheel A, which may be from either side, forms a pocket or recess within the hub of the wheel A, in which the collar D on the axle C revolves, the axle and collar being held in place by the loose journal B or the loose thimble E, which are made fast to the hub of the wheel A, and held in place by friction, thus becoming part of the wheel, and revolving with it on the axle C.

The collar D on the axle C, being confined in the recess or pocket formed by the counterbore, prevents lateral motion, but allows the wheel to revolve on the axle, or the axle to turn within the wheel, as may be required.

The hub of the wheel A is counterbored with a proper tool, and at one operation both seats are made, one for the loose journal B and one for the loose thimble E, which are turned up on the outer side to allow a tight fit, so that when fixed into their respective places within the hub of the wheel A they will remain there, being held in their places by friction.

Should the plan be adopted as shown in Fig. 4, the two seats would be formed at one operation, the counterbore being on outer side of the wheel, into which the loose journal would be fitted by pressure, as in the other plan; but the part of hub where the axle C comes in contact with the hub of the wheel A would be formed with loose fit, so that the axle C would be free to revolve when desired.

The inner part of the loose journal B and the loose thimble E, as shown in Figs. 1 and 2, and the loose journal B, as shown in Fig. 4, are turned to fit the axle C, but free to slip on the same.

I have found it necessary to have the arm C' of the axle, which fits into the loose journal B, turned with straight fit, and not tapering, as in that case, the pressure being against the taper, the parts are liable to become fast or stuck in service. In turning the arm of the axle straight there is no difficulty in making the loose journal B fit with proper play, and the work can be done at trifling cost.

It will be seen by this device that the hub of the wheel A, when counterbored and fitted to either the loose journal B or the loose thimble E, will form a recessed pocket within the hub of the wheel A for the collar D, which is formed on the axle, and the fastening is accomplished without the use of bolts, screws, or any parts that might become loose or deranged in service.

In some cases I may cast or otherwise form the loose journal B as a part of the wheel, or I may form it solid with and of same material as the wheel itself.

It will be seen that the arm C' extends through to the end of the loose journal which revolves in the oil-box, the arm being thus sufficiently lubricated, and at the same time protected from dust or grit.

I claim as my invention—

1. The axle C, having the arm C' and collar D, in combination with the counterbored hub and loose journal B, firmly fixed in or forming part of the wheel, the axle being secured in the hub by means of the collar fitting in the recess or pocket formed by the counterbore, and revolving therein, substantially as specified.

2. The axle C, having the arm C' and collar D, in combination with the counterbored hub, loose journal B, fixed therein, and loose thimble E, forced into the hub and retained by friction to secure the axle in the hub, substantially as specified.

WM. S. G. BAKER.

Witnesses:
CHARLES M. HARDY,
W. S. G. BAKER, Jr.